Patented Apr. 13, 1943

2,316,706

UNITED STATES PATENT OFFICE 2,316,706

PLASTIC COMPOSITIONS CONTAINING POLYISOBUTYLENE

Martin Mueller-Cunradi and Walter Daniel, Ludwigshafen-on-the-Rhine, Germany; assignors to Jasco, Incorporated, a corporation of Louisiana No Drawing. Application November 4, 1939, Serial No. 302,930. In France November 21, 1938

4 Claims. (Cl. 260—41)

The present invention relates to new plastic compositions containing polyisobutylene.

We have found that plastic compositions containing polyisobutylene, for example polyisobutylene having a molecular weight of 100,000, 200,000 or more, which contain carbon black and graphite, possess quite excellent properties and are far superior to corresponding mixtures having additions either of carbon black or graphite alone. While polyisobutylene, either by itself or with the addition of carbon black can be rolled to smooth thin foils or slabs only at temperatures above 160° or 180° C., and mixtures of polyisobutylene and graphite yield films or plates free from objection when treated on rollers above 100° C. only, mixtures of polyisobutylene which contain both carbon black and graphite can be made into smooth foils or plates on rollers or extruded to tubes or ribbons or extruded or pressed around wires or cables already at comparatively low temperatures, for example at from 80° to 100° C. At such low temperatures pure polyisobutylene or mixtures of polyisobutylene with carbon black or graphite cannot be worked at all or only while employing high mechanical power, whereby the polyisobutylene undergoes the danger of being degraded into products of a lower degree of polymerization.

The amounts of each graphite and carbon black to be employed for the production of the compositions of the present invention are generally speaking preferably not less than 10 per cent of the weight of the polyisobutylene employed, whereas the upper limit of the amounts of graphite and carbon black together amounts to about 300 per cent of the weight of the polyisobutylene employed.

Said mixtures of polyisobutylene with carbon black and graphite may be used with advantage in the form of foils or slabs for lining or coating tanks or for lining pipe lines. The foils or slabs may be pasted onto substrata of metal, wood, highly polymerized natural or artificial materials, textiles, leather, brickwork, concrete, asphalt or the like. For pasting there may be used for example conversion products of natural or synthetic rubber, for example the products obtainable by causing inorganic halides having a condensing action to act on rubber, as well as other highly polymerized substances, for example polyisobutylene having a molecular weight of 60,000 to 200,000 and more, in the form of solutions or dispersions. Pastes of the said adhesives containing fillers, such as carbon black, graphite or similar fillers as well as other known adhesives, for example asphalt or tar or mixtures of polyisobutylene and asphalt may also be used. Before being pasted the foils or slabs are preferably brushed with solvents or swelling agents for polyisobutylene, for example benzine, benzene or carbon tetrachloride. The pasting may be accelerated and improved by heating, for example by ironing, especially at the places where the foils or the slabs are to be joined, for example after slanting or overlapping.

It is often advantageous to cause the foils, especially after pasting, to swell again slightly at the zones of overlapping and to smooth the latter completely down by applying pressure, if required with simultaneous heating, or by rubbing, for example with abrasive paper. There are thus easily obtained compact linings or coatings free of pores which are stable to chemicals of a great variety of kinds, among others especially to lyes and acids, such as sulphuric acid or also nitric acid of 50 per cent. strength, and are affected only by substances capable of dissolving or swelling polyisobutylene, such as hydrocarbon oils, benzine or benzene. The stability to solvents or swelling agents may considerably be increased by a large addition of fillers, especially by large amounts of graphite and carbon black. Linings so prepared are eminently suitable for tanks for storing sulphuric acid of about 60 per cent strength for which, practically speaking, a satisfactory lining could hitherto not be offered. Sulphuric acid of this strength is known to effect an especially severe corrosion, whereas concentrated sulphuric acid, i. e. sulphuric acid of 98 per cent strength may safely be stored in iron tanks.

Nitric acid of 50 per cent. strength was hitherto usually stored in tanks made of chromium-nickel steel. Such storage tanks, however, are subject to severe corrosion if the nitric acid contains slight percentages of other acids, for example phosphoric acid. Linings made from polyisobutylene containing carbon black and graphite, however, are also resistant to acids of this type. These linings need not be cured in contrast to linings made from hard rubber. They resist ageing, are not subject to subsequent hardening and retain their elasticity. Besides, mixtures of polyisobutylene with graphite and carbon black may also be rolled to relatively thick bubble-free slabs, for example of a thickness of from 4 to 6 millimeters, while in the case of rubber bubble-free slabs of the same thickness can only be prepared by superposing rolled sheets of from 1 to 2 millimeters thickness and sticking them together.

Furthermore, mixtures of polyisobutylene with carbon black and graphite have a higher tensile strength than pure polyisobutylene and mixtures of polyisobutylene with either carbon black or graphite. Mixtures of polyisobutylene with carbon black and graphite are also adapted for use as packings. Gaskets so prepared are sufficiently soft to ensure a good packing with delicate materials, for example ceramic materials, such as glass or porcelain, while on the other hand they are sufficiently stable in shape, so that they can be repeatedly used.

The following example will further illustrate how the present invention may be carried out in practice, but the invention is not restricted to the said example. The parts are by weight.

The following four compositions are prepared by intimately mixing on hot rollers:

I.—200 parts of polyisobutylene (molecular weight 200,000) and 300 parts of an active carbon black
II.—200 parts of polyisobutylene (molecular weight 200,000) and 300 parts of carbon black prepared from naphthalene.
III.—200 parts of polyisobutylene (molecular weight 200,000) and 340 parts of graphite.
IV.—100 parts of polyisobutylene (molecular weight 200,000), 100 parts of carbon black prepared from naphthalene and 100 parts of graphite.

These mixtures were pressed at 133° C. for 5 minutes to test rings as they are usual for testing rubber mixtures. The data obtained by physical testing are set out in the list below:

| Mixture | Load to effect elongation of— | | Tensile strengt | Breaking elongation | Energy return (Schop pendulum) | Shore hardness in degrees at 20° C. |
| --- | --- | --- | --- | --- | --- | --- |
| | 300% | 500% | | | | |
| | $Kg.\,per\,cm.^2$ | $Kg.\,per\,cm.^2$ | $Kg./cm.^2$ | Per cent | Per cent | |
| I | 9 | 10 | 16 | 997 | 7 | 80 |
| II | 13 | 13 | 16 | 950 | 8 | 80 |
| III | | | 46 | 296 | 7 | 70 |
| IV | 41 | 68 | 72 | 543 | 7 | 80 |

Mixtures of polyisobutylene with carbon black and graphite thus show a substantial improvement in tensile strength along with an appreciable lessening of the elongation while their energy return remains practically unchanged. Mixture IV, having been briefly preheated to about 80° to 100° C. on the roller, in a kneader or in a warming cabinet, may be rolled to smooth foils or slabs, which is impossible with mixtures I, II and III under equal conditions. Furthermore, mixture IV, at a temperature of from 80° to 100°, may be worked by extruding presses of the type usual in the rubber industry, into endless tubes, hoses, threads, ribbons, profiles or covers for wires and cables. Mixture IV may also be moulded in closed moulds without the mouldings getting stuck to the walls of the moulds. The mouldings may also be worked at low temperatures by means of metal-cutting tools, for example on the lathe or with files.

The temperature best adapted for working the material, at which it is neither subject to the formation of bubbles at too high a temperature nor to adhesion at low temperature, differs according to the composition of the mixtures of polyisobutylene with carbon black and graphite or the degree of polymerization of polyisobutylene and may easily be ascertained by preliminary experiments. In the case of mixture IV it is from 80 to 100° C., as stated above.

Polymerization products prepared from mixture IV may easily be pasted on substrata. Tubes from the said mixtures may be secured inside other tubes. As adhesives suitable for this purpose there may be used for example a solution of a product prepared by treating natural rubber with phosphorous oxychloride or, if bubble formation at higher temperatures by remainders of solvents must be avoided, asphalts or mixtures of asphalts and polyisobutylene. The joints of the slabs or tubes so arranged may be firmly secured to one another by brushing the seams with carbon tetrachloride, benzine or benzene, by applying pressure or by rubbing.

Linings of tanks or tubes prepared from the materials according to the present invention are resistant to strong acids, for example to nitric acid of 50 per cent strength, for long periods of time.

What we claim is:

1. Plastic compositions consisting essentially of a solid polyisobutylene which is incapable of being rolled to smooth thin foils at temperatures below about 160° C. containing at least about 10 per cent of its weight of carbon black and at least about 10 per cent of its weight of graphite and at most 300 per cent of its weight of carbon black and graphite together, said plastic compositions being capable of being rolled to smooth thin foils at temperatures of about 80–100° C.

2. Plastic compositions as defined in claim 1 wherein the solid polyisobutylene has a molecular weight above about 60,000.

3. Plastic compositions as defined in claim 1 wherein the solid polyisobutylene has a molecular weight above about 100,000.

4. Plastic compositions comprising equal parts of each of polyisobutylene of a molecular weight of about 200,000, carbon black and graphite.

MARTIN MUELLER-CUNRADI.
WALTER DANIEL.